(No Model.)
S. BAKER.
WHIP.
No. 297,962. Patented May 6, 1884.
FIG. 1.
FIG. 2.
FIG. 3.
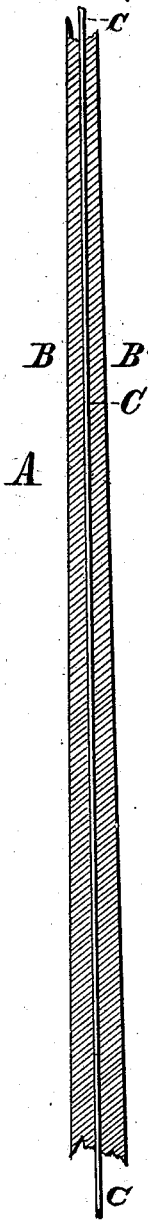
Witnesses:
Willie O. Stark
John C. Duerr
Inventor:
Samuel Baker,
by Michael J. Stark,
Attorney.

UNITED STATES PATENT OFFICE.

SAMUEL BAKER, OF BUFFALO, NEW YORK.

WHIP.

SPECIFICATION forming part of Letters Patent No. 297,962, dated May 6, 1884.

Application filed March 5, 1884. (No model.)

*To all whom it may concern:*

Be it known that I, SAMUEL BAKER, of Buffalo, in the county of Erie and State of New York, have invented certain new and useful Improvements on Whips; and I do hereby declare that the following description of my said invention, taken in connection with the accompanying sheet of drawings, forms a full, clear, and exact specification, which will enable others skilled in the art to which it appertains to make and use the same.

My present invention has general reference to whips; and it consists, essentially, in the novel and peculiar combination of parts and details of construction, as hereinafter first fully set forth and described, and then pointed out in the claim.

In the drawings, already mentioned, which serve to illustrate my said invention more fully, Figure 1 is an elevation of my improved whip. Fig. 2 is a similar view of a portion thereof, part being broken away to show the inserted flexible strip. Fig. 3 is a longitudinal sectional elevation.

Like parts are designated by corresponding letters of reference in all the figures.

The object of my present invention is the production of a flexible non-destructible whip. To attain this result, I construct my whip of three pieces—viz., two reed or rattan pieces of semicircular transverse section, B B', and one central strip of buckskin prepared in any manner that will preserve its flexibility and at the same time destroy or partly destroy its elasticity, such strip, C, of buckskin being glued between the two pieces of reed or rattan, so as to form, as it were, an integral part thereof.

In preparing my whips, I proceed to produce the parts B B' by cutting strips having a rectangular cross-section, the strips being cut tapering to correspond with the whips to be produced. I then cut a buckskin previously prepared as described into narrow strips and glue one of them between the two reeds B B', after which the parts are securely tied together to allow the glue to set and dry. Now, the whips are planed or otherwise "rounded," and finished in the well-known manner.

The preparation of the buckskins, hereinbefore described, is best carried on by immersing the skins into a thin solution of glue or gelatine until the skin is thoroughly soaked. It is then removed and stretched, to allow it to dry. This process converts the skin into a sheet having a horny texture and appearance, so that it can be readily cut, planed, and otherwise worked and operated upon in the preparation of the whip, which is not the case when the said buckskin is in its natural condition.

It will now be readily observed that by the insertion of the strip of buckskin in the center of the whip I have produced a whip that is practically indestructible—that is to say, one which will not allow a portion to be broken off the whip, even if the wooden portion thereof is severed, said central strip, owing to its flexibility and toughness, holding the broken parts together.

A whip having my central strip of buckskin is extremely flexible, and superior to any other whip with which I am acquainted.

It is perfectly evident that the expense of manufacturing my whip does not exceed that of any other first-class article, the strips of buckskin costing but a nominal sum.

I am aware that whips have been made in which strips of rawhide have been embedded into saw-kerfs produced in the exterior surface of the whip-stock. Such construction is very objectionable, because the stock is considerably weakened by the kerfs, which the rawhide, afterward glued therein, is not capable of filling to produce a perfect union of the parts.

Having thus fully described my invention, I claim as new and desire to secure to me by Letters Patent of the United States—

As an improved article of manufacture, a whip, A, consisting of two semicircular strips, B B', and a central strip of prepared buckskin, C, the parts being united together substantially in the manner, as and for the object specified.

In testimony that I claim the foregoing as my invention I have hereto set my hand in the presence of two subscribing witnesses.

SAMUEL BAKER.

Attest:
MICHAEL J. STARK,
HENRY MCMARTIN.